United States Patent [19]

Tarancon

[11] Patent Number: 4,467,075

[45] Date of Patent: Aug. 21, 1984

[54] SURFACE TREATMENT OF A SOLID POLYMERIC MATERIAL WITH A REACTIVE GAS

[75] Inventor: Gregorio Tarancon, South Plainfield, N.J.

[73] Assignee: Union Carbide Corporation, Danbury, Conn.

[21] Appl. No.: 520,599

[22] Filed: Aug. 5, 1983

[51] Int. Cl.$^3$ .............................. C08J 3/00; C08J 7/12
[52] U.S. Cl. .................................... 525/356; 525/377; 525/383
[58] Field of Search ............... 525/356; 148/6.3, 6.35; 525/377, 383

[56] References Cited

U.S. PATENT DOCUMENTS

| | | | |
|---|---|---|---|
| 3,758,450 | 9/1973 | Margrove et al. | 525/356 |
| 3,765,929 | 10/1973 | Martin | 148/6.35 |
| 3,775,489 | 11/1973 | Margrove et al. | 260/648 F |
| 3,992,221 | 11/1976 | Homsy et al. | 134/21 |
| 3,998,180 | 12/1976 | Hawkins et al. | 118/666 |

*Primary Examiner*—Lester L. Lee
*Attorney, Agent, or Firm*—Saul R. Bresch

[57] ABSTRACT

In a batch process for the treatment of the surface of a solid polymeric material by a gas reactive therewith comprising the following steps:
(a) providing a closed system comprising a chamber;
(b) introducing the material into the chamber;
(c) heating the chamber and the material to a selected temperature in the range of about 100° F. to about 200° F.;
(d) evacuating the system;
(e) introducing the reactive gas into the system in an amount (i) of up to about 10 percent in excess of the theoretical amount of gas required to react with the surface of the polymeric material to a desired depth and (ii) sufficient to provide a partial pressure in the system in the range of about 0.1 psia to about 3 psia;
(f) introducing an inert gas into the system in an amount sufficient to provide a total pressure in the system or about one atmosphere;
(g) maintaining the selected temperature for a period of time sufficient for the reaction to take place between the gas and the surface;
(h) evacuating the system;
(i) introducing air into the system to provide about atmospheric pressure; and
(j) removing the material,
the improvement comprising carrying out the following step prior to step (c):
providing an electrostatic charge on the surface of the solid polymer material in such a manner that the charge is maintained throughout steps (c) through (g).

4 Claims, No Drawings

4,467,075

SURFACE TREATMENT OF A SOLID POLYMERIC MATERIAL WITH A REACTIVE GAS

TECHNICAL FIELD

This invention relates to a process for the surface treatment of polymeric materials to reduce their permeability to solvents and to increase their chemical resistance.

BACKGROUND ART

Surface modification of plastics, whether of the rigid or flexible type, with fluorine or other halogens, or other reactive gases such as sulfur trioxide in the vapor state, has been found to be commercially advantageous in that it is capable of providing, for example, containers having a reduced permeability insofar as liquids having solvent characteristics are concerned and having increased chemical resistance to various liquids and gases which would otherwise react with the untreated container material. One such process and the apparatus therefor is described in U.S. Pat. No. 3,998,180, which is incorporated by reference herein. The disadvantages of this and other treatment processes having surface modification as an objective are manifold. Some of the processes need a great deal of apparatus because of the steps and conditions imposed by the process, which may entail moving fluorine from a holding chamber to a reaction chamber and back again, or the use of very low or high pressures. The more apparatus, of course, the higher the cost factor. Other processes pose a threat to safety. After all, reactive gases such as fluorine can be highly toxic, highly corrosive, and irritating. Fluorine is the most reactive element known. It vigorously reacts with almost all organic and inorganic substances, and because of its highly oxidizing nature, has a fire potential exceeding that of even oxygen. Any process that uses relatively high temperatures, pressures, and/or concentrations of fluorine falls into the hazardous category by increasing the possiblity of fire or leakage. Finally, some processes raise the pollution factor because of the amount of fluorine and/or fluorine by-products, such as hydrogen fluoride, which have to be disposed of after the fluorination process is completed. The problems of more apparatus, safety, and pollution are, of course, interrelated because in order to solve the latter problems of safety and pollution, the quantity of apparatus is usually increased and, concommitantly, the investment and operating costs including energy requirements. It is not surprising, then, that industry is constantly striving to decrease the amount of apparatus needed to carry out the surface modification and/or increase the safety factor.

One solution to this problem may be found in commonly assigned application Ser. No. 404,814 filed on Aug. 3, 1981 entitled "Halogenation Treatment" by Gregorio Tarancon, which is incorporated by reference herein.

DISCLOSURE OF THE INVENTION

An object of this invention, therefore, is to provide another solution whereby the amount of apparatus required to carry out the surface treatment is further decreased and the process is simplified.

Other objects and advantages will become apparent hereinafter.

According to the present invention, an improvement has been discovered in a batch process for the treatment of the surface of a solid polymeric material by a gas reactive therewith comprising the following steps:
(a) providing a closed system comprising a chamber;
(b) introducing solid polymeric material into the chamber;
(c) heating the chamber and the material to a selected temperature in the range of about 100° F. to about 200° F.;
(d) evacuating the system;
(e) introducing a reactive gas into the system in an amount (i) of up to about 10 percent in excess of the theoretical amount of gas required to react with the surface of the polymeric material to a desired depth and (ii) sufficient to provide a partial pressure in the system in the range of about 0.1 psia to about 3 psia;
(f) introducing an inert gas into the system in an amount sufficient to provide a total pressure in the system of about one atmosphere;
(g) maintaining the selected temperature for a period of time sufficient for the reaction to take place between the gas and the surface;
(h) evacuating the system;
(i) introducing air into the system to provide about atmospheric pressure; and
(j) removing the material.

The improvement comprises carrying out the following step prior to step (c): providing an electrostatic charge on the surface of the solid polymeric material in such a manner that the charge is maintained throughout steps (c) through (g).

DETAILED DESCRIPTION

Subject process is a batch process as opposed to a continuing process. The plastic items to be treated are loaded into a chamber, treated, and removed. Then, the process is repeated. The treatment may be a halogenation treatment or one accomplished by another reactive gas. It will be understood that the gas used to react with the surface of the solid polymeric material may be a liquid or solid at ambient temperature, e.g. sulfur trioxide, but it must be in the vapor state in order to be utilized in subject process. The term "halogen" is defined herein to include any of the halogens or mixtures thereof. The preferred halogens are fluorine and a mixture of fluorine and bromine. The apparatus and process steps and conditions described hereinafter are generally applicable to the halogens and sulfur trioxide as a group.

The items to be treated may be structurally rigid or flexible and of a great variety of shapes, sizes, textures, and chemical compositions. The most common items processed are plastic containers, particularly bottles, but sheets, films, pipes and parts for automobiles and other devices are contemplated, whose solvent resistance and corrosion properties can be improved thereby. The only criteria for being a candidate for subject process is that the object to be treated is a solid, that it is advantageously modified by the reaction of its surface constituents with the reactive gas of choice, and that its surface is capable of holding an electrostatic charge.

The process utilizes conventional equipment arranged to carry out the prescribed steps under the stated conditions. A typical system will be described here. Such a system comprises a chamber having a volume of 5000 cubic feet constructed on two steel skids. The chamber has one or two doors, which open hydraulically with a door area of about 50 square feet.

The connections for the process piping are four inch nominal pipe thread flanged openings. While the apparatus is designed to easily accept a pressure range running from full vacuum to 45 pounds per square inch absolute (psia) and temperatures in the range of about 70° to about 400° F., the operating temperature for subject process will be in the range of about 100° to about 200° F. and preferably in the range of about 120° F. to about 180° F., and the operating pressure will be in the range of about 0.1 psia to about one atmosphere.

The walls of the chamber are heated in order to maintain a particular temperature in the chamber. Resistance type heating is most commonly used. The top and bottom of the chamber will have valve connections for manifolds, which, in turn, will have valve connections for an inert gas and, in this case, fluorine, and for evacuation. Both the chamber and manifold will have miscellaneous connections for thermocouples, pressure transducers, gas sampling tubes, and other control equipment.

One of two single stage vacuum pumps can be used to achieve system evacuation. They can be rotary vane vacuum pumps connected in series.

All of the equipment, which comes in contact with the fluorine, such as the chamber, manifolds, piping, valves, and heat exchangers are made of passivated stainless steel, e.g., AISI type 304L.

A two or three stage liquid slurry scrubber with a slurry pump is connected to the vacuum pump to convert any process by-products to suitable landfill. All of the valves used in the system are bellows sealed gates valves. The entire system is carefully sealed to prevent leakage and the parts are selected with this in mind.

It will be understood by those skilled in the art that the apparatus used in the system is a combination of conventional off-the-self equipment, which can handle halogens or sulfur trioxide, e.g., the chamber can be one used in sterilizer service, and that many variations can be used. The apparatus can also be scaled up or down, i.e., it can be sized according to the commercial application and the quantity of material to be treated in each batch.

The process is initiated by introducing the material to be treated into the chamber of the closed system. The electrostatic charge may be applied to the surface of the material prior to its introduction into the chamber of while it is in the chamber, but prior to treatment. The charge is applied to all surfaces of the material, e.g., where a plastic bottle is involved, an electrostatic charge is provided on both the external and internal surfaces of the bottle. At this point, air is present in the chamber at atmospheric pressure.

The electrostatic charge can be applied to the surface of the solid plastic material by various known contact or induction techniques, e.g., by using a high voltage bass end distribution grid. The grid can be powered by alternating current, direct current, or a combination of both. The current density can be in the range of about 0.1 to about 5 micro Faradays per square centimeter and is preferably in the range of about 1.5 to about 1.5 micro Faradays per square centimeter.

After application of the charge, the chamber is heated up by external means, to provide a temperature in the range of about 100° F. to about 200° F. and preferably in the range of about 120° F. to about 180° F. The chamber is heated until the interior walls of the chamber and the material to be treated are at a temperature preferably in the latter range of about 120° F. to about 180° F.

This step removes any moisture from the items to be treated. Once the chamber and its contents reach the selected temperature, the air with the moisture in the form of water vapor are evacuated from the system by means of the vacuum pump down to a pressure of less than about 1 psia and preferably less than 0.5 psia.

Fluorine is then introduced into the system in an amount of up to about 10 percent by weight in excess of the theoretical amount of fluorine required to fluorinate the material to a desired depth. Preferably, the fluorine is added in an amount of about 5 percent by weight in excess. The fluorine is also introduced in sufficient quantity to raise the partial pressure in the system to about 0.1 to about 3 psia, the preferably about 0.1 to about 1 psia. The amount of fluorine within the stated ranges, necessary to fluorinate the surface of the material to the desired depth, i.e., a depth which will provide the permeability and/or chemical resistance required for the service to which the material is to be put, is based on past experience accumulated by trial and error. This method of determination is used because of the unlimited number of variables which arise with regard to the materials to be treated, e.g., size, shape, chemical composition, use, i.e., depth of fluorination needed therefor, and number of items (or total surface area) to be treated. The size and shape of the chamber, as well as the flow rate at which the fluorine is to be introduced, are other variables to be taken into account.

An inert gas, preferably nitrogen, is then injected into the system in an amount sufficient to provide a total pressure of about one atmosphere. Any gas, which will not react with the material to be treated, the apparatus, and the fluorine can be used; however, as stated, a low partial pressure of air, i.e., less than about one psia, will not affect the process. Neither the fluorine nor the inert gas have to be preheated before introducted into the system.

While it is preferred that the fluorine be introduced prior to the inert gas, many variations of this procedure are acceptable. For example, the inert gas or a mixture of fluorine and inert gas can be injected first, or some fluorine or inert gas can be introduced first, followed by the mixture. By-product is removed by evacuating the system, once more, down to less than 1 psia and preferably less than about 0.1 psia. The by-product is directed to a liquid slurry scrubber, converted to landfill, and thus disposed of. A cascading calcium carbonate slurry scrubber which forms insoluble calcium fluoride can be used effectively here.

The residence time or dwell time of the material in the chamber can be determined by analyzing both the depth of fluorine penetration in the material to be treated and the off-gas, which is sent to the scrubber. The former is most important because it confirms the end result, i.e., whether the fluorinated item will be capable of performing as intended. The latter is an indication of the efficiency of the process, one the parameters have been set, taking all of the variables into account. Typical residence times are in the range of about 1 to about 1000 minutes for a load of medium size (one quart or liter) polyethylene bottles in a 5,000 cubic foot chamber. Residence time has, however, a lower priority then other features of subject process such as safety, reduction in amount of equipment, and efficient utilization of fluorine. Thus, the residence time will be extended in favor of the latter features.

After the system is evacuated, air is permitted to enter, atmospheric pressure is restored, and the fluorinated materials are removed. It is noted that this air also functions as a purge for any residual fluorine which may have diffused into the plastic.

The advantages of the system are as follows:

1. The electrostatic charge distributes itself evenly over the surface to be treated. This aids in achieving a uniformly treated surface.

2. The electrostatic phenomena helps to reduce a high concentration of reactive gas quickly thus promoting a fast reaction.

3. The capacity of operating at low temperatures and pressures all but eliminates the risk of fire and leakage.

4. The efficient utilization of reactive gas not only reduces the cost of gas, but reduces the pollution factor immediately.

5. Since there is no limit on the size of the chamber, the chamber can be sized to provide the daily temperature of the treater in one batch, and the batch will be uniformly treated.

6. Preheating or premixing of the reactive gas and/or inert are not required or even beneficial.

7. Just as there is no need for high pressure, there is no need for extremely low pressures, e.g., pressures below about 20 millimeters of mercury. This relieves both the equipment and the energy cost.

8. The air that is used in the system does not have to be dried prior to entry. Air evacuated by step (d) is used to carry off any moisture. The air introduced in step (i) is used to purge the system of fluorine.

I claim:

1. In a batch process for the treatment of the surface of a solid polymeric material by a gas reactive therewith comprising the following steps:
    (a) providing a closed system comprising a chamber;
    (b) introducing the material into the chamber;
    (c) heating the chamber and the material to a selected temperature in the range of about 100° F. to about 200° F.;
    (d) evacuating the system;
    (e) introducing the reactive gas into the system in an amount (i) of up to about 10 percent in excess of the theoretical amount of gas required to react with the surface of the polymeric material to a desired depth and (ii) sufficient to provide a partial pressure in the system in the range of about 0.1 psia to about 3 psia;
    (f) introducing an inert gas into the system in an amount sufficient to provide a total pressure in the system of about one atmosphere;
    (g) maintaining the selected temperature for a period of time sufficient for the reaction to take place between the gas and the surface;
    (h) evacuating the system;
    (i) introducing air into the system to provide about atmospheric pressure; and
    (j) removing the material,
        the improvement comprising carrying out the following step prior to step (c):
        providing an electrostatic charge on the surface of the solid polymer material by contact or induction manner that the charge ia maintained throughout steps (c) through (g).

2. The process defined in claim 1 wherein the temperature range in step (c) is about 120° F. to about 180° F. and the percent in excess of gas in step (e) (i) is up to about 5 percent.

3. The process defined in claim 1 wherein the gas is fluorine or a mixture of fluorine and bromine.

4. The process defined in claim 2 wherein the gas is fluorine or a mixture of fluorine and bromine.

* * * * *

UNITED STATES PATENT AND TRADEMARK OFFICE
CERTIFICATE OF CORRECTION

PATENT NO. : 4,467,075
DATED : August 21, 1984
INVENTOR(S) : Gregorio Tarancon

It is certified that error appears in the above-identified patent and that said Letters Patent are hereby corrected as shown below:

At column 6, change line 25 to --tion in such a manner that the charge is maintained--

Signed and Sealed this

Eighth Day of January 1985

[SEAL]

Attest:

GERALD J. MOSSINGHOFF

*Attesting Officer*   *Commissioner of Patents and Trademarks*